(12) United States Patent
Yamada

(10) Patent No.: US 12,515,340 B2
(45) Date of Patent: Jan. 6, 2026

(54) CONTROL METHOD FOR ROBOT SYSTEM AND ROBOT SYSTEM

(71) Applicant: SEIKO EPSON CORPORATION, Tokyo (JP)

(72) Inventor: Yoshihito Yamada, Chino (JP)

(73) Assignee: SEIKO EPSON CORPORATION (JP)

( * ) Notice: Subject to any disclaimer, the term of this patent is extended or adjusted under 35 U.S.C. 154(b) by 144 days.

(21) Appl. No.: 18/495,074

(22) Filed: Oct. 26, 2023

(65) Prior Publication Data
US 2024/0139955 A1 May 2, 2024

(30) Foreign Application Priority Data
Oct. 28, 2022 (JP) .................................. 2022-173080

(51) Int. Cl.
*B25J 9/16* (2006.01)
(52) U.S. Cl.
CPC .......... *B25J 9/1674* (2013.01); *B25J 9/1651* (2013.01)
(58) Field of Classification Search
CPC ...... B25J 9/1674; B25J 9/1651; B25J 9/1602; G05B 2219/34491; G05B 2219/43004; G05B 2219/50198
See application file for complete search history.

(56) References Cited

U.S. PATENT DOCUMENTS

| 6,140,789 A | 10/2000 | Kachi et al. |
| 6,778,867 B1 * | 8/2004 | Ziegler ................. B25J 9/1674 |
| | | 318/563 |
| 2023/0015734 A1 * | 1/2023 | Årsvold .............. B23K 9/0953 |

FOREIGN PATENT DOCUMENTS

JP 2011-152612 A 8/2011

\* cited by examiner

*Primary Examiner* — Dylan M Katz
(74) *Attorney, Agent, or Firm* — Harness, Dickey & Pierce, P.L.C.

(57) ABSTRACT

A control method for a robot system is provided. The robot system includes a robot, a robot control unit that controls an operation of the robot, and a safety monitoring unit that monitors the operation of the robot. The control method includes: a speed reduction control step of causing the robot control unit to perform speed reduction control of the robot, based on a speed reduction command; and an abnormality detection step of causing the safety monitoring unit to acquire an operation speed of the robot at a predetermined interval during the speed reduction control step, and to detect an abnormality in the speed reduction control from a speed change calculated based on the acquired operation speed.

4 Claims, 4 Drawing Sheets

CONTROL METHOD FOR ROBOT SYSTEM AND ROBOT SYSTEM

The present application is based on, and claims priority from JP Application Serial Number 2022-173080, filed Oct. 28, 2022, the disclosure of which is hereby incorporated by reference herein in its entirety.

BACKGROUND

1. Technical Field

The present disclosure relates to a control method for a robot system and a robot system.

2. Related Art

In the field of human-friendly robots that perform a task in collaboration with a human, a configuration where a safety monitoring unit monitors an operation of a robot and where an emergency stop of the robot is made when an abnormality or trouble in the robot is detected, is known. For example, JP-A-2011-152612 describes a robot control device that monitors a speed reduction state of a robot after the robot receives a stop command.

However, the robot control device of JP-A-2011-152612 performs the monitoring, using a comparative speed calculated based on a maximum speed of the robot, and therefore may not be able to sufficiently detect a speed reduction abnormality when the robot reduces the speed from a speed that is not the maximum speed.

SUMMARY

According to an aspect of the present disclosure, a control method for a robot system is provided. The robot system includes a robot, a robot control unit that controls an operation of the robot, and a safety monitoring unit that monitors the operation of the robot. The control method includes: a speed reduction control step of causing the robot control unit to perform speed reduction control of the robot, based on a speed reduction command; and an abnormality detection step of causing the safety monitoring unit to acquire an operation speed of the robot at a predetermined interval during the speed reduction control step, and to detect an abnormality in the speed reduction control from a speed change calculated based on the acquired operation speed.

According to another aspect of the present disclosure, a robot system includes: a robot; a robot control unit that controls an operation of the robot; and a safety monitoring unit that monitors the operation of the robot. The robot control unit performs speed reduction control of the robot, based on a speed reduction command. The safety monitoring unit acquires an operation speed of the robot at a predetermined interval during the speed reduction control, and detects an abnormality in the speed reduction control from a speed change calculated based on the acquired operation speed.

DESCRIPTION OF EMBODIMENTS

The control method for the robot system and the robot system according to the present disclosure will now be described in detail, based on an embodiment shown in the accompanying drawings.

Figure 1:
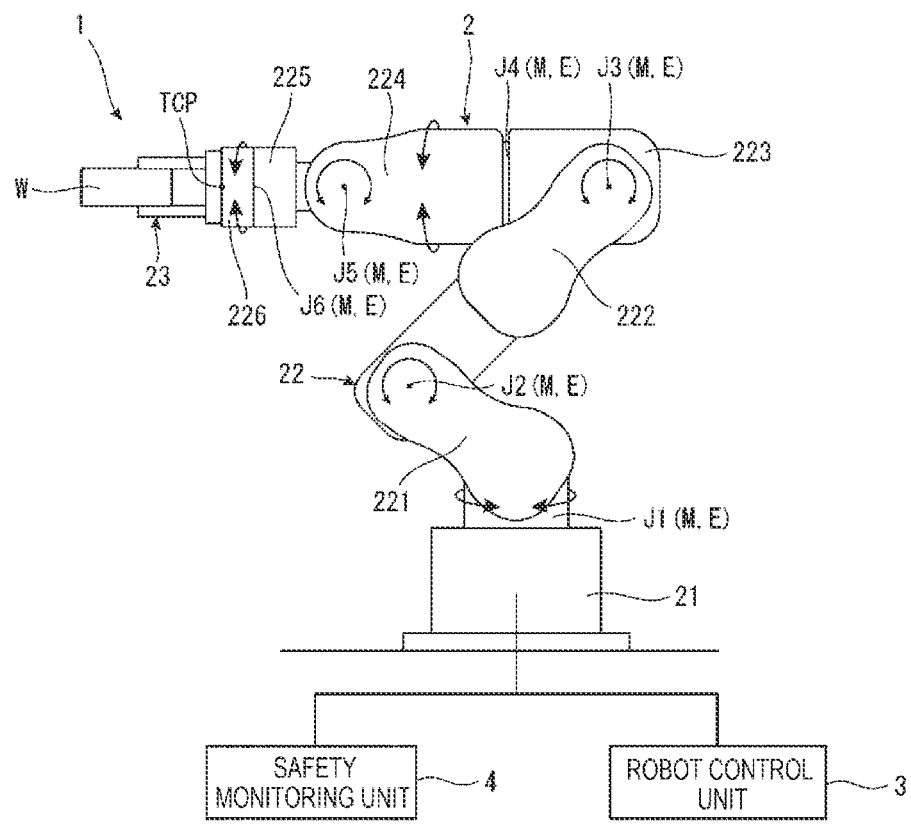
FIG. 1 shows the configuration of a robot system according to a preferred embodiment.
Figure 2:
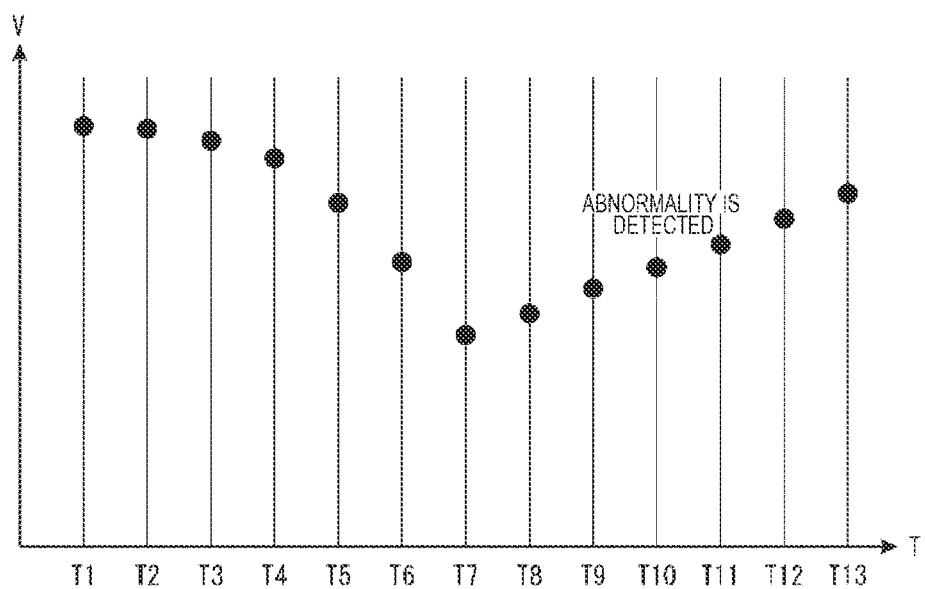
FIG. 2 is a graph showing a state where speed reduction control is abnormal.
Figure 3:
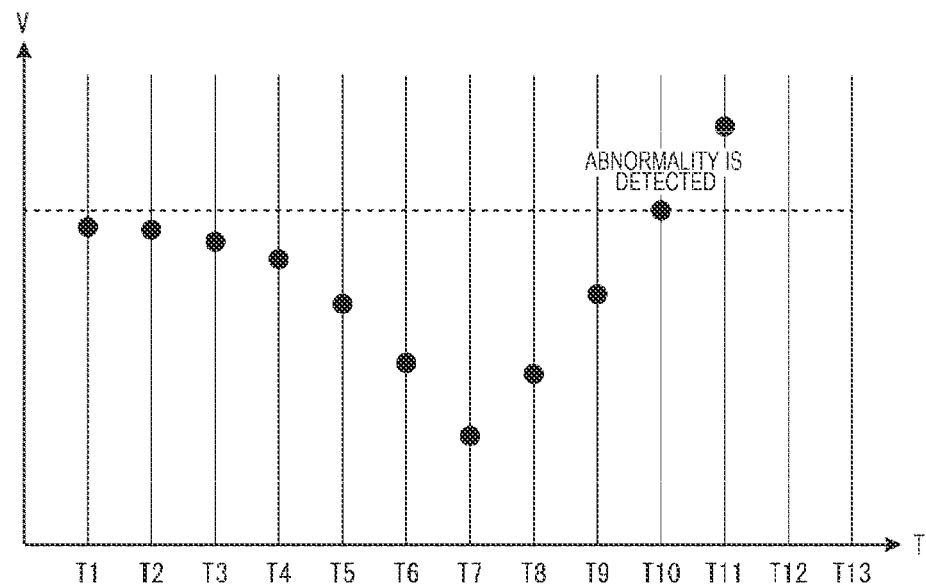
FIG. 3 is a graph showing a state where speed reduction control is abnormal.
Figure 4:
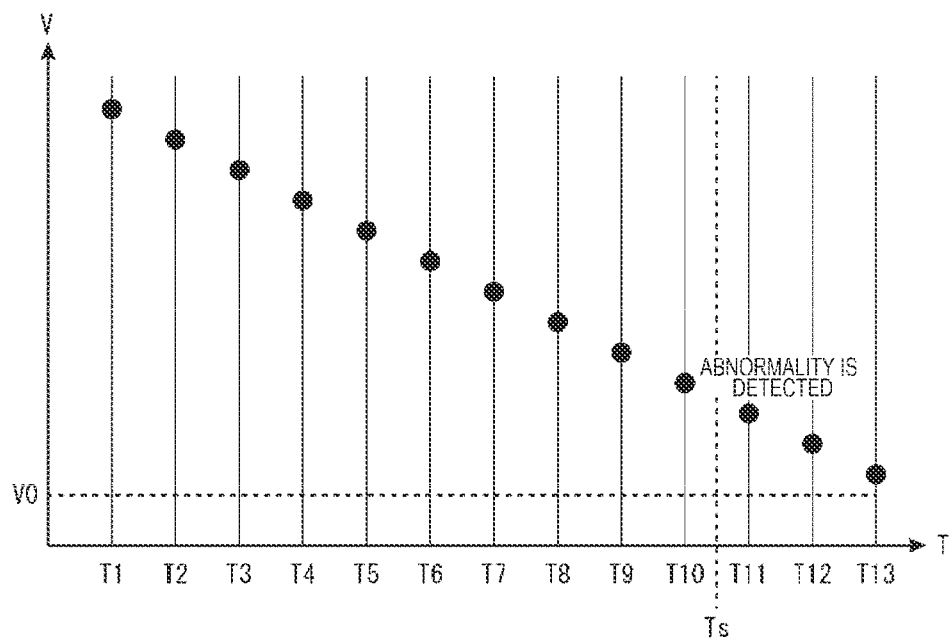
FIG. 4 is a graph showing a state where speed reduction control is abnormal.
Figure 5:
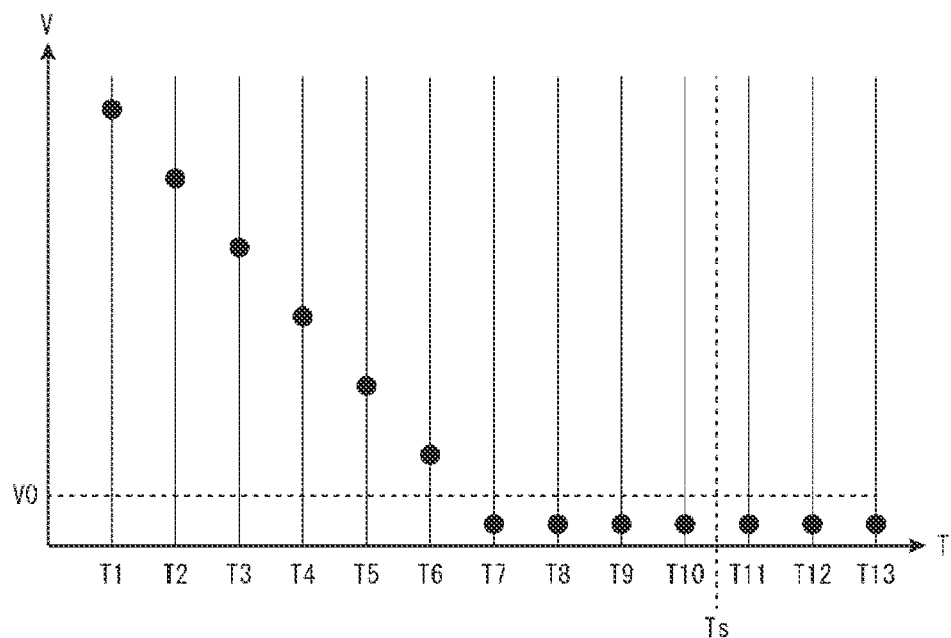
FIG. 5 is a graph showing a state where speed reduction control is normal.
Figure 6:
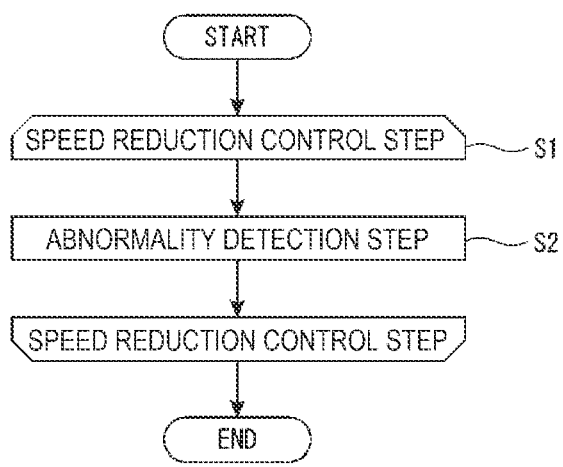
FIG. 6 is a flowchart showing a control method for the robot system.
Figure 7:
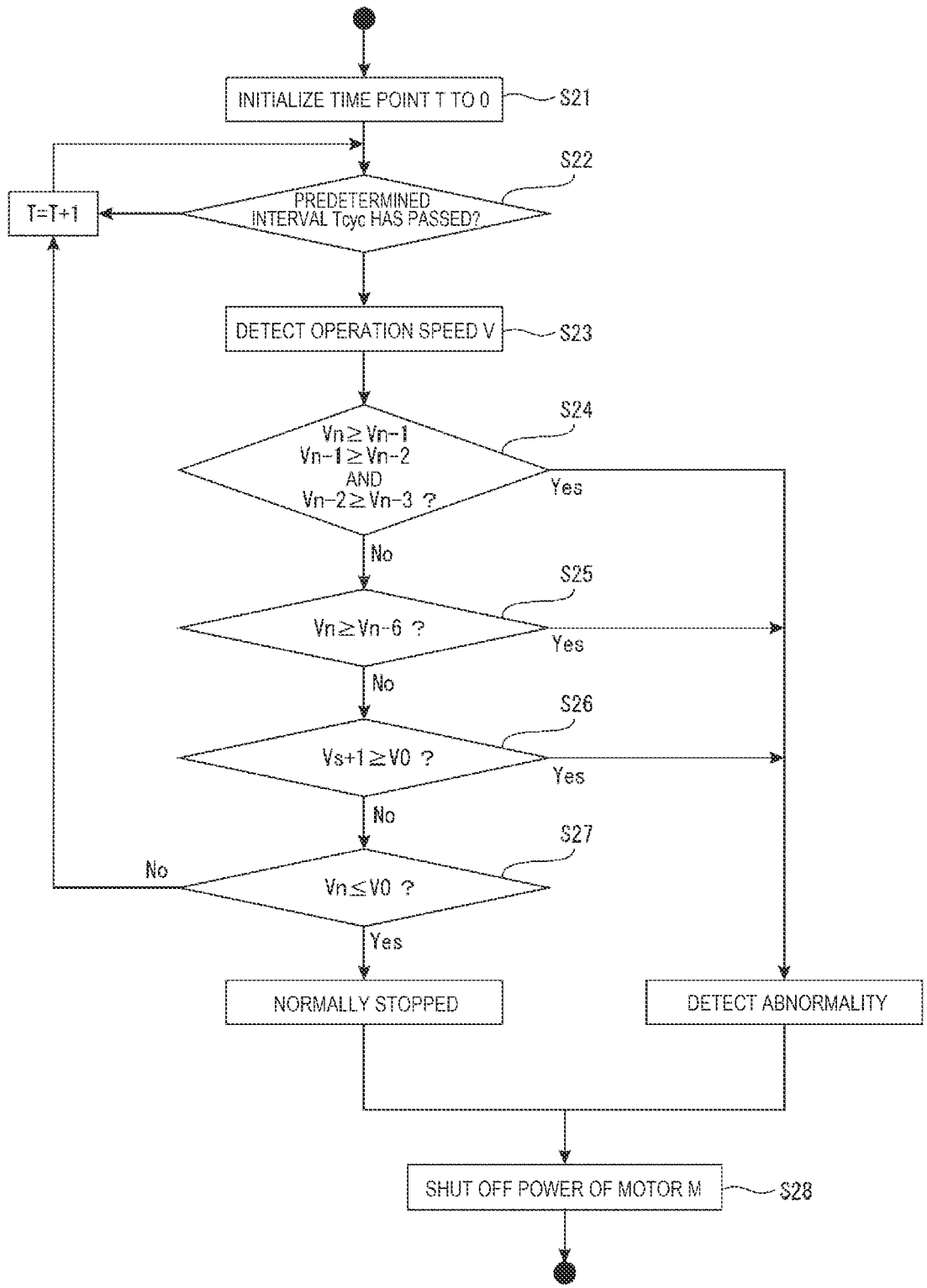
FIG. 7 is a flowchart showing the control method for the robot system.

FIG. 1 shows the configuration of a robot system according to a preferred embodiment. FIGS. 2 to 4 are graphs showing a state where speed reduction control is abnormal. FIG. 5 is a graph showing a state where speed reduction control is normal. FIGS. 6 and 7 are flowcharts showing a control method for a robot system.

A robot system 1 shown in FIG. 1 has a robot 2, a robot control unit 3 that controls the drive of the robot 2, and a safety monitoring unit 4 that monitors the drive of the robot 2.

The robot 2 is a six-axis vertical articulated robot having six drive shafts. The robot 2 has a base 21, a robot arm 22 coupled to the base 21 in a rotationally movable manner, and a tool 23 installed at the distal end of the robot arm 22.

The robot arm 22 is a robotic arm having six arms 221, 222, 223, 224, 225, 226 coupled in a rotationally movable manner and has six joints J1, J2, J3, J4, J5, J6. Of these six joints J1 to J6, the joints J2, J3, J5 are bending joints and the joints J1, J4, J6 are torsion joints. Each of the joints J1, J2, J3, J4, J5, J6 is equipped with a motor M and an encoder E. The robot control unit 3 executes feedback control such that the angle of rotation of the joints J1 to J6 indicated by an output from the encoder E coincides with a target position for each of the joints J1 to J6, while the robot system 1 is in operation. At the distal end of such a robot arm 22, a tool center point (hereinafter referred to as "TCP") as a control point is set.

The tool 23 is a hand that holds a workpiece W. However, the configuration of the tool 23 is not particularly limited. A suitable configuration can be selected according to the target task.

The robot 2 has been described above. However, the configuration of the robot 2 is not particularly limited. For example, a SCARA robot (horizontal articulated robot), a dual-arm robot having two of the foregoing robot arms 22, or the like, may be employed. Also, a self-propelled robot having the base 21 that is not fixed may be employed.

The robot control unit 3 controls the drive of the robot 2, for example, based on an operation command from a host computer, not illustrated. The robot control unit 3 is formed of a computer, for example, and has a processor that processes information, a memory communicatively coupled to the processor, and an external interface that implements coupling with an external device. Various programs executable by the processor are saved in the memory. The processor can read and execute the various programs or the like stored in the memory.

The safety monitoring unit 4 monitors the drive of the robot 2 by the robot control unit 3, and causes the robot 2 to make an emergency stop when an abnormality is detected at the time of the speed reduction of the robot 2. The method for the emergency stop is not particularly limited. For example, the power of the robot 2 may be shut off. Also, a physical brake device may be installed in the robot 2 in advance and the brake device may be activated to stop the robot 2. The safety monitoring unit 4 is formed of a computer, for example, and has a processor that processes information, a memory communicatively coupled to the processor, and an external interface that implements coupling with an external device. Various programs executable by the processor are saved in the memory. The processor can read and execute the various programs or the like stored in the memory.

The safety monitoring unit 4 detects an abnormality at the time of the speed reduction control of the robot 2 by the robot control unit 3, using the three methods described below.

First Method

In a first method, the safety monitoring unit 4 first repeatedly detects an operation speed V of the robot 2 every predetermined period while the robot control unit 3 is performing the speed reduction control of the robot 2. The operation speed V in this embodiment means the operation speed of the TCP. However, the operation speed V is not particularly limited and can be suitably set. For example, the operation speed of the workpiece W may be employed. The operation speed V can also be detected, based on a control parameter such as the length of each of the arms 221 to 226, the amount of offset of each of the joints J1 to J6, or the amount of correction to a software origin (correction pulse value), and the output from each encoder E, that is, the angle of rotation of each of the joints J1 to J6. However, the method for detecting the operation speed V is not particularly limited. For example, the operation speed V may be detected, using a laser Doppler measurement device, or an inertial sensor may be attached to the robot arm 22 and the operation speed V may be detected, based on an output from the inertial sensor. Also, the predetermined period may be measured using actual time or may be decided using a clock frequency of the robot control unit 3. The predetermined period is not particularly limited. However, in this embodiment, the predetermined period is set to be approximately 5 milliseconds.

Next, the safety monitoring unit 4 detects an abnormality when a state where the operation speed V acquired at a certain time point, in this embodiment, the most recent time point, is equal to or higher than the operation speed V acquired at the immediately previous time point, has occurred a predetermined number of times N consecutively.

An example where an abnormality is detected will now be described, based on FIG. 2. FIG. 2 shows a state where the operation speed V increases in the middle due to a certain abnormality despite the speed reduction control of the robot 2 being performed. In the illustrated example, N=3. As shown in the illustration, the safety monitoring unit 4 detects the operation speed V every predetermined period, that is, at time points T1, T2, T3, and the like. In the illustrated example, the operation speed V acquired at a time point T8 is equal to or higher than the operation speed V acquired at the immediately previous time point T7. The operation speed V acquired at a time point T9 next to the time point T8 is equal to or higher than the operation speed V acquired at the immediately previous time point T8. The operation speed V acquired at a time point T10 next to the time point T9 is equal to or higher than the operation speed V acquired at the immediately previous time point T9. When the operation speed V acquired at the most recent time point is equal to or higher than the operation speed V acquired at the immediately previous time point three consecutive times in this way, the safety monitoring unit 4 detects an abnormality in the robot 2 and causes the robot 2 to make an emergency stop.

N is not limited to 3 and may be 2 or smaller or may be 4 or greater. However, preferably, N is approximately 3 or greater and 10 or smaller. Thus, an abnormality at the time of the speed reduction control of the robot 2 can be detected more accurately and in a short time. At this point, it is conceivable that the operation speed V momentarily changes in the robot 2 due to the influence of a noise or the like and that, due to this change, the operation speed V acquired at the most recent time point is equal to or higher than the operation speed V acquired at the previous time point, even though in practice the operation speed V is reduced as normal speed reduction control is performed. In such a case, if N is too small, an abnormality may be detected by mistake despite normal speed reduction control being performed. Meanwhile, if N is too large, it may take time until an abnormality is detected after the abnormality occurs, and it may take a long time until the robot 2 makes an emergency stop after the abnormality occurs.

In such a method, the operation speed V acquired at the most recent time point and the operation speed V acquired at the immediately previous time point are compared with each other. Therefore, a speed reduction abnormality can be detected accurately.

Second Method

In a second method, the safety monitoring unit 4 first repeatedly detects the operation speed V of the robot 2 every predetermined period while the robot control unit 3 is performing the speed reduction control of the robot 2. The method for detecting the operation speed V is similar to that in the foregoing first method. Next, the safety monitoring unit 4 detects an abnormality when the operation speed V acquired at a certain time point, in this embodiment, the most recent time point, is equal to or higher than the operation speed V acquired at a time point that is M periods before. Here, M2.

An example where an abnormality is detected will now be described, based on FIG. 3. FIG. 3 shows a state where the operation speed V increases in the middle due to a certain abnormality despite the speed reduction control of the robot 2 being performed. In the illustrated example, M=6. As shown in the illustration, the safety monitoring unit 4 detects the operation speed V every predetermined period, that is, at time points T1, T2, T3, and the like. In the illustrated example, the operation speed V acquired at a time point T10 is equal to or higher than the operation speed V acquired at a time point T4 that is M periods before. When the operation speed V acquired at the present time point is equal to or higher than the operation speed V acquired at the time point that is 6 periods before in this way, the safety monitoring unit 4 detects an abnormality in the robot 2 and causes the robot 2 to make an emergency stop.

M is not particularly limited if 2 or greater. However, preferably, M is approximately 5 or greater and 10 or smaller. Thus, an abnormality in the speed reduction control of the robot 2 can be detected more accurately and in a short time. At this point, as described in the case of the first method, it is conceivable that the operation speed V momentarily changes in the robot 2 due to the influence of a noise or the like and that, due to this change, the operation speed V acquired at the most recent time point is equal to or higher than the operation speed V acquired at the time point that is M periods before, even though in practice the operation speed V is reduced as normal speed reduction control is performed. In such a case, if M is too small, the interval between the present time point and the time point that is M periods before is short and the operation speed V does not drop sufficiently during that time. The operation speed V at the present time point is equal to or greater than the operation speed V at the time point that is M periods before because of the foregoing momentary change in the operation speed V due to the noise. Therefore, an abnormality may be detected by mistake despite normal speed reduction control being performed. Meanwhile, if M is too large, it may take time until an abnormality is detected, and it may take a long time until the robot 2 makes an emergency stop after the abnormality occurs.

In such a method, the operation speed V acquired at the most recent time point and the operation speed V acquired at the time point that is M periods before are compared with each other. Therefore, a speed reduction abnormality can be detected accurately.

Third Method

In a third method, the safety monitoring unit 4 detects an abnormality when the operation speed V at an expected stop time point Ts of the robot 2 is equal to or higher than a predetermined speed V0. The expected stop time point Ts can be found, for example, based on a speed reduction command. Instead of being found based on the speed reduction command, the expected stop time point Ts can also be a time point when a predetermined time has passed since the start of the speed reduction control based on the speed reduction command. Also, the predetermined speed V0 is set to be low enough to regard that the robot 2 is substantially stopped.

An example where an abnormality is detected will now be described in detail, based on FIG. 4. FIG. 4 shows a state where the degree of speed reduction at the time of the speed reduction control of the robot 2 is lower than the degree of speed reduction designated by a command. As shown in the illustration, the safety monitoring unit 4 detects the operation speed V every predetermined period, that is, at time points T1, T2, T3, and the like. In the illustrated example, the expected stop time point Ts is located between a time point T10 and a time point T11 and the operation speed V acquired at the time point T11 is higher than the predetermined speed V0. When the operation speed V at the expected stop time point Ts, more specifically, the operation speed V detected immediately after the expected stop time point Ts, is equal to or higher than the predetermined speed V0 in this way, the safety monitoring unit 4 detects an abnormality in the robot 2 and causes the robot 2 to make an emergency stop.

In such a method, an abnormality is detected, based on the operation speed V at the expected stop time point Ts. Therefore, a speed reduction abnormality can be detected accurately.

The safety monitoring unit 4 also determines that the speed reduction control of the robot 2 by the robot control unit 3 is normal, by the following method. In this method, the safety monitoring unit 4 first repeatedly detects the operation speed V of the robot 2 every predetermined period while the robot control unit 3 is performing the speed reduction control of the robot 2. The method for detecting the operation speed V is similar to that in the foregoing first method. As shown in FIG. 5, when the operation speed V becomes lower than the predetermined speed V0 before the expected stop time point Ts, the safety monitoring unit 4 determines that the speed reduction control has normally finished, and gives a notification to that effect.

The configuration of the robot system 1 has been briefly described above. Next, a control method for the robot system 1 will be described. As shown in FIG. 6, the control method for the robot system 1 includes: a speed reduction control step S1 of causing the robot control unit 3 to perform the speed reduction control of the robot 2, based on a speed reduction command; and an abnormality detection step S2 of causing the safety monitoring unit 4 to acquire the operation speed V of the robot 2 at a predetermined interval during the speed reduction control step S1, and to detect an abnormality in the speed reduction control from a speed change calculated based on the acquired operation speed V. Since an abnormality in the speed reduction control is detected from a speed change in the operation speed V during the speed reduction control in this way, the abnormality in the speed reduction control can be accurately detected. The control method will be described in detail below.

Speed Reduction Control Step S1

In the speed reduction control step S1, the robot control unit 3 performs the speed reduction control to reduce the speed of the robot 2 which is being driven, and to stop the robot 2, for example, based on a speed reduction command from a host computer, not illustrated.

Abnormality Detection Step S2

As shown in FIG. 7, in the abnormality detection step S2, the safety monitoring unit 4 first initializes a time point T to 0 in step S21. The time point T is an integer. Next, in step S22, the safety monitoring unit 4 determines whether a predetermined interval Tcyc equivalent to one period has passed or not. In this embodiment, when the remainder in the division of the time point T by the predetermined interval Tcyc is 0, the safety monitoring unit 4 determines that the predetermined interval Tcyc has passed. When the predetermined interval Tcyc has not passed, the safety monitoring unit 4 increments the time point T, that is, increases the time point T by 1, and executes step S22 again. When the predetermined interval Tcyc has passed, the safety monitoring unit 4 detects the operation speed V of the robot 2 in step S23.

Next, in step S24, the safety monitoring unit 4 detects an abnormality in the speed reduction control of the robot 2, using the first method. That is, the safety monitoring unit 4 determines whether an operation speed Vn acquired at an immediately previous time point Tn≥an operation speed Vn-1 acquired at a time point Tn-1, the operation speed Vn-1 acquired at the time point Tn-1≥an operation speed Vn-2 acquired at a time point Tn-2, and the operation speed Vn-2 acquired at the time point Tn-2≥an operation speed Vn-3 acquired at a time point Tn-3, or not. When Vn≥Vn-1, Vn-1≥Vn-2, and Vn-2≥Vn-3, the safety monitoring unit 4 detects an abnormality in the speed reduction control of the robot 2.

Meanwhile, when not Vn≥Vn-1, Vn-1≥Vn-2, and Vn-2≥Vn-3, the safety monitoring unit 4 in step S25 detects an abnormality in the speed reduction control of the robot 2, using the second method. That is, the safety monitoring unit 4 determines whether the operation speed Vn acquired at the immediately previous time point Tn an operation speed Vn-6 acquired at a time point Tn-6 that is six periods before, or not. When Vn≥Vn-6, the safety monitoring unit 4 detects an abnormality in the speed reduction control of the robot 2.

Meanwhile, when not Vn≥Vn-6, the safety monitoring unit 4 in step S26 detects an abnormality in the speed reduction control of the robot 2, using the third method. That is, the safety monitoring unit 4 determines whether an operation speed Vs+1 acquired when the time point T is a time point Ts+1 immediately after the expected stop time point Ts the predetermined speed V0 or not. When Vs+1V0, the safety monitoring unit 4 detects an abnormality in the speed reduction control of the robot 2.

Meanwhile, when not Vs+1V0, the safety monitoring unit 4 in step S27 determines whether the operation speed Vn acquired at the immediately previous time point the predetermined speed V0 or not. When Vn≥V0, the safety monitoring unit 4 determines that the robot has normally stopped. Meanwhile, when Vn>V0, the safety monitoring unit 4 increments the time point T and executes step S22 again.

When an abnormality in the speed reduction control of the robot 2 is detected in the foregoing steps S24, S25, S26 and when it is determined in the foregoing step S27 that the robot has normally stopped, the safety monitoring unit 4 shuts off the power of each motor M in step S28.

In such a method, an abnormality in the speed reduction control of the robot 2 is detected using the three methods. Therefore, an abnormality in the speed reduction control of the robot 2 can be detected more accurately. The order of steps S24, S25, S26, S27 is not particularly limited. For example, from a viewpoint of wishing to detect an abnormality in the speed reduction control of the robot 2 as early as possible, the degrees of priority are S25524>S26>27. The steps can be executed in order from the highest degree of priority.

The robot system 1 and the control method therefor have been described above. Such a control method for the robot system 1 is a control method for the robot system 1 having the robot 2, the robot control unit 3 controlling the operation of the robot 2, and the safety monitoring unit 4 monitoring the operation of the robot 2, as described above. The control method includes: the speed reduction control step S1 of causing the robot control unit 3 to perform the speed reduction control of the robot 2, based on a speed reduction command; and the abnormality detection step S2 of causing the safety monitoring unit 4 to acquire the operation speed V of the robot 2 at a predetermined interval during the speed reduction control step S1, and to detect an abnormality in the speed reduction control from a speed change calculated based on the acquired operation speed V. According to the method of detecting an abnormality in the speed reduction control from a speed change in the operation speed V during the speed reduction control in this way, an abnormality in the speed reduction control can be accurately detected.

Also, in the abnormality detection step S2, as described above, an abnormality is detected when the state where the operation speed V acquired at a certain time point is equal to or higher than the operation speed V acquired at the immediately previous time point has occurred the predetermined number of times N consecutively. According to such a method, a speed reduction abnormality can be accurately detected.

Also, in the abnormality detection step S2, as described above, an abnormality is detected when the operation speed V acquired at a certain time point is equal to or higher than the operation speed V acquired at a time point that is two periods or more before. According to such a method, a speed reduction abnormality can be accurately detected.

Also, as described above, the robot system 1 includes: the robot 2; the robot control unit 3 controlling an operation of the robot 2; and the safety monitoring unit 4 monitoring the operation of the robot 2. The robot control unit 3 performs the speed reduction control of the robot 2, based on a speed reduction command. The safety monitoring unit 4 acquires the operation speed V of the robot 2 at a predetermined interval during the speed reduction control, and detects an abnormality in the speed reduction control from a speed change calculated based on the acquired operation speed V. According to the configuration where an abnormality in the speed reduction control is detected from a speed change in the operation speed V during the speed reduction control in this way, an abnormality in the speed reduction control can be accurately detected.

The control method for the robot system and the robot system according to the present disclosure have been described above, based on the illustrated embodiment. However, the present disclosure is not limited to this embodiment. The configuration of each part can be replaced with any configuration having a similar function. Also, any other component may be added to the present disclosure.

What is claimed is:

1. A control method of a robot for causing one or more processors to execute a process, the control method comprising executing on the one or more processors the steps of:
    performing speed reduction control on an operation of the robot based on a speed reduction command;
    calculating an expected stop time of the operation of the robot based on the speed reduction command;
    repeatedly acquiring an operation speed of the operation of the robot at a predetermined interval during the speed reduction control;
    determining whether a first acquired operation speed right after the expected stop time is more than a predetermined speed;
    detecting an abnormality in the speed reduction control when the first acquired operation speed is equal to or more than the predetermined speed such that the one or more processors is configured to cause the robot to make an emergency stop;
    determining whether a second acquired operation speed before the expected stop time is less than the predetermined speed; and
    detecting a state in which the speed reduction control has normally finished when the second acquired operation speed is less than the predetermined speed.

2. The control method for the robot system according to claim 1, wherein
    the abnormality is detected when a state where the operation speed acquired at a certain time point is equal to or higher than the operation speed acquired at an immediately previous time point occurs a predetermined number of times consecutively.

3. The control method for the robot system according to claim 1, wherein
    the abnormality is detected when the operation speed acquired at a certain time point is equal to or higher than the operation speed acquired at a time point that is two periods or more before.

4. A robot system comprising:
    a robot;
    a memory configured to store a program; and
    one or more processors configured to execute the program so as to:
        perform speed reduction control on an operation of the robot based on a speed reduction command;
        calculate an expected stop time of the operation of the robot based on the speed reduction command;
        repeatedly acquire an operation speed of the operation of the robot at a predetermined interval during the speed reduction control;
        determine whether a first acquired operation speed right after the expected stop time is more than a predetermined speed;

detect an abnormality in the speed reduction control when the first acquired operation speed is equal to or more than the predetermined speed such that the one or more processors is configured to cause the robot to make an emergency stop;

determine whether a second acquired operation speed before the expected stop time is less than the predetermined speed; and detect a state in which the speed reduction control has normally finished when the second acquired operation speed is less than the predetermined speed.

\* \* \* \* \*